(12) United States Patent
Yoshida et al.

(10) Patent No.: US 12,291,624 B2
(45) Date of Patent: May 6, 2025

(54) POLYTETRAFLUOROETHYLENE COMPOSITION

(71) Applicant: DAIKIN INDUSTRIES, LTD., Osaka (JP)

(72) Inventors: Ken Yoshida, Osaka (JP); Keisuke Hagi, Osaka (JP); Hirokazu Yukawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 721 days.

(21) Appl. No.: 17/057,228

(22) PCT Filed: May 15, 2019

(86) PCT No.: PCT/JP2019/019295
§ 371 (c)(1),
(2) Date: Nov. 20, 2020

(87) PCT Pub. No.: WO2019/225434
PCT Pub. Date: Nov. 28, 2019

(65) Prior Publication Data
US 2021/0206946 A1 Jul. 8, 2021

(30) Foreign Application Priority Data

May 22, 2018 (JP) ................................. 2018-097927

(51) Int. Cl.
*C08K 7/06* (2006.01)
*C08K 3/04* (2006.01)

(52) U.S. Cl.
CPC .................. *C08K 7/06* (2013.01); *C08K 3/04* (2013.01); *C08K 2201/004* (2013.01)

(58) Field of Classification Search
CPC . C08K 7/04; C08K 7/06; C08K 13/06; C08K 2201/004; C08K 3/04; C08K 3/06; C08L 27/12; C08L 27/18; C08L 2205/16; C08L 2666/55; C08L 2666/72
See application file for complete search history.

(56) References Cited

U.S. PATENT DOCUMENTS

| | | | |
|---|---|---|---|
| 5,438,104 A | 8/1995 | Kishi et al. | |
| 5,604,285 A | 2/1997 | Miyamori et al. | |
| 6,020,417 A | 2/2000 | Umemoto et al. | |
| 2009/0227723 A1 | 9/2009 | Kaya et al. | |
| 2013/0143117 A1 | 6/2013 | Koh et al. | |
| 2016/0083565 A1 | 3/2016 | Matsumoto | |
| 2017/0362526 A1 | 12/2017 | Matsumoto | |
| 2021/0206968 A1 | 7/2021 | Yoshida et al. | |

FOREIGN PATENT DOCUMENTS

| | | |
|---|---|---|
| CN | 105051103 A | 11/2015 |
| JP | 51-126241 A | 11/1976 |
| JP | 56-34020 B2 | 8/1981 |
| JP | 58-74739 A | 5/1983 |
| JP | 60-18696 B2 | 5/1985 |
| JP | 2-251599 A | 10/1990 |
| JP | 5-255564 A | 10/1993 |
| JP | 5-320455 A | 12/1993 |
| JP | 7-11088 A | 1/1995 |
| JP | 7-290582 A | 11/1995 |
| JP | 9-194626 A | 7/1997 |
| JP | 10-254199 A | 9/1998 |
| JP | 2002-128981 A | 5/2002 |
| JP | 2002-317089 A | 10/2002 |
| JP | 2003-41083 A | 2/2003 |
| JP | 2003183625 A * | 7/2003 |
| JP | 2003213063 A * | 7/2003 |
| JP | 2006-176544 A | 7/2006 |
| JP | 2007-023230 A | 2/2007 |
| JP | 2007-186676 A | 7/2007 |
| JP | 2008-208159 A | 9/2008 |
| JP | 2008-216639 A | 9/2008 |
| JP | 2010-216612 A | 9/2010 |
| JP | 2011-184827 A | 9/2011 |
| JP | 2011-526948 A | 10/2011 |
| JP | 2012-84523 A | 4/2012 |
| WO | 2007/055338 A1 | 5/2007 |
| WO | 2010/002592 A1 | 1/2010 |
| WO | 2016/114244 A1 | 7/2016 |
| WO | 2018/096908 A1 | 5/2018 |

OTHER PUBLICATIONS

JP 2003183625 A machine translation (Jul. 2003).*
JP 2003213063 A machine translation (Jul. 2003).*
Extended European Search Report for counterpart EP Appln. No. 19807047.6 dated Jan. 5, 2022.
Notice of Allowance issued Aug. 20, 2021 in related U.S. Appl. No. 17/057,196.
International Preliminary Report on Patentability with translation of Written Opinion dated Nov. 24, 2020, in International Application No. PCT/JP2019/019295.
International Preliminary Report on Patentability with translation of Written Opinion dated Nov. 24, 2020, in related International Application No. PCT/JP2019/019299.
Extended European Search Report for related EP Appln. No. 19806915.5 dated Jan. 31, 2022.
Communication dated May 5, 2021, from the United States Patent and Trademark Office in related U.S. Appl. No. 17/057,196.
International Search Report issued Jul. 9, 2019 in International Application No. PCT/JP2019/019299.
Sogabe et al., "The Present and Future of Pitch-based Carbon Fibers", Proceedings of the 31st Composite Material Seminar, Feb. 26, 2018 (11 pages total).
International Search Report issued Aug. 6, 2019 in International Application No. PCT/JP2019/019295.
Written Opinion issued Nov. 28, 2019 in Japanese Application No. 2018-097927.
Written Request for Appeal dated Apr. 8, 2020 in Japanese Application No. 2018-097927.

* cited by examiner

*Primary Examiner* — Ana L. Woodward
(74) *Attorney, Agent, or Firm* — Sughrue Mion, PLLC

(57) ABSTRACT

A polytetrafluoroethylene composition containing polytetrafluoroethylene and fibrous filler. The fibrous filler has an average fiber length of 100 μm or shorter and includes fibers having a fiber length of longer than 160 μm in a proportion of 15% by mass or less.

5 Claims, No Drawings

POLYTETRAFLUOROETHYLENE COMPOSITION

CROSS REFERENCE TO RELATED APPLICATIONS

This application is a National Stage of International Application No. PCT/JP2019/019295 filed May 15, 2019, claiming priority based on Japanese Patent Application No. 2018-097927 filed May 22, 2018.

TECHNICAL FIELD

The disclosure relates to polytetrafluoroethylene compositions.

BACKGROUND ART

Polytetrafluoroethylene is known to be used with filler incorporated therein in order to improve its mechanical properties.

For example, Patent Literature 1 discloses a modified polytetrafluoroethylene composition obtained by blending a copolymer of tetrafluoroethylene and a copolymerizable monomer in a proportion of 1.0% by weight or less with carbon fibers having a specific surface area of 1.0 to 2.0 $m^2/g$.

CITATION LIST

Patent Literature

Patent Literature 1: JP 2003-041083 A

SUMMARY OF INVENTION

Technical Problem

The disclosure aims to provide a polytetrafluoroethylene (hereinafter, referred to as "PTFE") composition having excellent stretching processability in spite of containing fibrous filler.

Solution to Problem

The disclosure relates to a PTFE composition containing PTFE and fibrous filler,
the fibrous filler having an average fiber length of 100 μm or shorter and including fibers having a fiber length of longer than 160 μm in a proportion of 15% by mass or less.

The fibrous filler preferably includes fibers having a fiber length of shorter than 80 μm in a proportion of 75% by mass or more.

The fibrous filler preferably includes at least one selected from the group consisting of a carbon fiber and a glass fiber.

The polytetrafluoroethylene is preferably present in an amount of 60 to 97% by mass.

The fibrous filler is preferably present in an amount of 3 to 40% by mass.

Advantageous Effects of Invention

The PTFE composition of the disclosure has excellent stretching processability in spite of containing fibrous filler.

DESCRIPTION OF EMBODIMENTS

The PTFE composition of the disclosure is specifically described hereinbelow.

A person skilled in the art conventionally knows as technical knowledge that PTFE compositions containing fibrous filler are excellent in compressive creep resistance and abrasion resistance but are unsuitable for stretch processing. Thus, no studies have been made to their stretching processability. The inventors surprisingly found after intensive studies that use of a specific fibrous filler can provide a PTFE composition having excellent stretching processability in spite of containing fibrous filler.

In other words, the PTFE composition of the disclosure contains PTFE and fibrous filler, and the fibrous filler has an average fiber length of 100 μm or shorter and includes fibers having a fiber length of longer than 160 μm in a proportion of 15% by mass or less. Having these features, the PTFE composition has excellent mechanical strength such as compression strength and excellent stretching processability.

The PTFE may be either a homo-PTFE consisting only of a TFE unit or a modified PTFE containing a TFE unit and a modifying monomer unit based on a modifying monomer copolymerizable with TFE.

Also, the PTFE may be either a high molecular weight PTFE having non melt-processibility and fibrillatability or a low molecular weight PTFE having melt-fabricability and non-fibrillatability. Still, the PTFE is preferably a high molecular weight PTFE having non melt-processibility and fibrillatability.

The modifying monomer may be any monomer copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene; ethylene; and fluorine-containing vinyl ether containing a nitrile group. One modifying monomer may be used alone or two or more thereof may be used.

The perfluorovinyl ether may be, but is not limited to, an unsaturated perfluoro compound represented by the following formula (1):

$$CF_2=CF-ORf^1 \quad (1)$$

(wherein $Rf^1$ is a perfluoro organic group). The "perfluoro organic group" herein means an organic group obtainable by replacing every hydrogen atom binding to a carbon atom by a fluorine atom. The perfluoro organic group may contain ether oxygen.

An example of the perfluorovinyl ether is perfluoro (alkyl vinyl ether) (PAVE) in which $Rf^1$ in the formula (1) is a C1-C10 perfluoroalkyl group. The perfluoroalkyl group preferably has a carbon number of 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is perfluoropropyl vinyl ether (PPVE) in which the perfluoroalkyl group is a perfluoropropyl group.

Examples of the perfluorovinyl ether further include a perfluorovinyl ether in which $Rf^1$ in the formula (1) is a C4-C9 perfluoro (alkoxy alkyl) group, a perfluorovinyl ether in which $Rf^1$ is a group represented by the following formula:

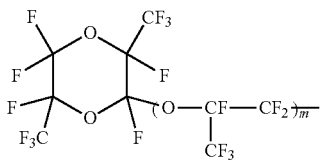

(wherein m is 0 or an integer of 1 to 4), and a perfluorovinyl ether in which $Rf^1$ is a group represented by the following formula:

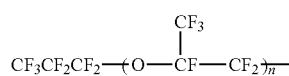

(wherein n is an integer of 1 to 4).

Examples of the perfluoroalkyl ethylene include, but are not limited to, perfluorobutyl ethylene (PFBE), perfluorohexyl ethylene, and (perfluorooctyl)ethylene.

The fluorine-containing vinyl ether containing a nitrile group is more preferably a fluorine-containing vinyl ether represented by $CF_2=CFORf^2CN$ (wherein $Rf^2$ is a C2-C7 alkylene group optionally containing an oxygen atom between two carbon atoms).

The modifying monomer in the modified PTFE preferably includes at least one selected from the group consisting of HFP, CTFE, VDF, PPVE, PFBE, and ethylene, more preferably at least one monomer selected from the group consisting of PPVE, HFP, and CTFE.

The modified PTFE preferably contains the modifying monomer unit in the range of 0.001 to 2 mol %, more preferably in the range of 0.001 to 1 mol %.

The amount of the modifying monomer unit constituting the modified PTFE herein can be calculated by appropriately combining NMR, FT-IR, elemental analysis, and X-ray fluorescence analysis in accordance with the type of the monomer.

The PTFE preferably has a melt viscosity (MV) of $1.0\times10$ Pa·s or more, more preferably $1.0\times10^2$ Pa·s or more, still more preferably $1.0\times10^3$ Pa·s or more.

The melt viscosity can be measured in conformity with ASTM D 1238. Specifically, a 2-g sample previously heated at a measurement temperature (380° C.) for five minutes is subjected to the measurement using a flow tester (available from Shimadzu Corporation) and a 2ϕ-8 L die at the above temperature at a load of 0.7 MPa.

The PTFE preferably has a standard specific gravity (SSG) of 2.130 to 2.230, more preferably 2.140 or more and 2.190 or less.

The standard specific gravity (SSG) herein can be measured by water displacement in conformity with ASTM D 4895-89.

The PTFE preferably has a melting point of 324° C. to 360° C. The melting point of fluororesin herein is a temperature corresponding to the maximum value on a heat-of-fusion curve drawn using a differential scanning calorimeter (DSC) at a temperature-increasing rate of 10° C./min.

The PTFE preferably has fibrillatability. The fibrillatability means the property of easily being fibrillated to provide fibrils. PTFE having fibrillatability can provide a continuous paste-extruded bead by paste extrusion molding. Such a bead (prebaked bead) shows stretchability. In contrast, paste-extruded PTFE having non-fibrillatability fails to provide a continuous paste-extruded bead or, even when it provides a continuous paste-extruded bead, the prebaked bead hardly shows stretchability.

The PTFE preferably has non melt-processability in addition to the fibrillatability. The non melt-processability means that the polymer cannot be melt-processed.

The PTFE is preferably in the form of PTFE molding powder. The PTFE molding powder is powder obtainable by suspension polymerization of TFE. The PTFE molding powder may be obtainable by granulating polymerized particles by a known method.

The PTFE is preferably in the form of particles, and the particles preferably have an average particle size of 1 to 2000 µm. The average particle size is more preferably 1000 µm or smaller, still more preferably 700 µm smaller, while preferably 10 µm or greater, more preferably 15 µm or greater. Too large an average particle size may cause difficulty in molding or mixing with fibrous filler. Too small an average particle size may cause poor fluidity of a PTFE composition.

The average particle size of PTFE particles is determined in conformity with JIS K6891 or determined by measurement using a laser diffraction particle size distribution analyzer at a dispersion pressure of 3.0 bar without cascade impaction and taking the particle size corresponding to 50% of the cumulative volume in the particle size distribution as the average particle size. The laser diffraction particle size distribution analyzer may be HELOS & RODOS available from JEOL Ltd., for example.

The PTFE composition of the disclosure contains a specific fibrous filler. The presence of polytetrafluoroethylene and a specific fibrous filler can improve the mechanical strength such as compression strength and achieve excellent stretching processability.

The fibrous filler has an average fiber length of 100 µm or shorter. In order to achieve better stretching processability, the average fiber length is preferably 95 µm or shorter, more preferably 80 µm or shorter, still more preferably 60 µm or shorter.

The lower limit of the average fiber length may be 40 µm, for example, although not being limited thereto.

The average fiber length is determined by photographing an image of fibers at a magnification of 200× in each of randomly selected ten fields of view with a scanning electron microscope, measuring the fiber lengths of 200 fibers, and determining the average fiber length (by weight). The proportion of fibers having a fiber length of longer than 160 µm and the proportion of fibers having a fiber length of shorter than 80 µm are determined by photographing an image of fibers at a magnification of 200× in each of randomly selected ten fields of view with a scanning electron microscope, measuring the fiber lengths of 200 fibers, and calculating the proportions of the target fibers from the distribution.

In terms of maintenance of mechanical strength and mixability with polytetrafluoroethylene, the fibrous filler preferably has an average fiber diameter of 1 to 25 µm, more preferably 1 to 20 µm, still more preferably 5 to 20 µm.

The average fiber diameter is determined by photographing an image of fibers at a magnification of 200× in each of randomly selected ten fields of view with a scanning electron microscope, measuring the fiber lengths of 200 fibers, and determining the number average fiber diameter.

The fibrous filler includes fibers having a fiber length of longer than 160 µm in a proportion of 15% by mass or less. In order to further improve the stretching processability, the proportion of the fibers having a fiber length of longer than 160 μm is preferably 10% by mass or less, more preferably 5% by mass or less, still more preferably 4% by mass or less.

In order to achieve better mechanical strength and better stretching processability, the fibrous filler preferably includes fibers having a fiber length of shorter than 80 μm in a proportion of 75% by mass or more, more preferably 80% by mass or more.

The proportion of fibers having a fiber length of longer than 160 μm and the proportion of fibers having a fiber length of shorter than 80 μm are determined by photographing an image of fibers at a magnification of 200× in each of randomly selected ten fields of view with a scanning electron microscope, measuring the fiber lengths of 200 fibers, and calculating the proportions of the target fibers from the distribution.

In order to improve the mechanical strength such as compression strength and achieve better stretching processability, the fibrous filler preferably has an aspect ratio of 2.0 to 8.0, more preferably 2.5 to 7.0, still more preferably 3.0 to 6.0.

The aspect ratio is calculated by photographing an image of fibers at a magnification of 200× in each of randomly selected ten fields of view with a scanning electron microscope, and calculating the aspect ratio from the average fiber length and average fiber diameter of 200 fibers.

Examples of the fibrous filler include, but is not limited to, a glass fiber, a carbon fiber, a graphite fiber, a ceramic fiber, rock wool, slag wool, a potassium titanate whisker, a silicon carbide whisker, a sapphire whisker, an aluminum borate whisker, wollastonite, copper wire, steel wire, stainless steel wire, and a silicon carbide fiber; and organic fibers such as an aromatic polyamide fiber, rayon, a phenolic resin, and a polybenzimidazole fiber. In terms of the dispersibility in resin, preferred among these is at least one selected from the group consisting of a carbon fiber, a glass fiber, a ceramic fiber, and an organic fiber, more preferred is at least one selected from the group consisting of a carbon fiber and a glass fiber.

The carbon fiber may be any of a PAN-based carbon fiber, a pitch-based carbon fiber, and a cellulose-based carbon fiber. The carbon fiber may be an either isotropic carbon fiber or an anisotropic carbon fiber.

In terms of the abrasion resistance, the fibrous filler preferably has a specific gravity of 1.3 or more and less than 2.0, more preferably 1.4 to 1.9. The specific gravity can be determined in accordance with the butanol substitution method (JIS R 7222).

The PTFE composition of the disclosure preferably contains PTFE in an amount of 60 to 97% by mass. The amount of PTFE is more preferably 70% by mass or more, still more preferably 80% by mass or more, while more preferably 95% by mass or less, still more preferably 92% by mass or less.

The PTFE composition of the disclosure preferably contains fibrous filler in an amount of 3 to 40% by mass. Less than 3% by mass of the fibrous filler may fail to exert the filling effect of the filler, while more than 40% by mass of the fibrous filler may significantly reduce the mechanical properties.

The amount of the fibrous filler is more preferably 5% by mass or more, still more preferably 8% by mass or more, while more preferably 30% by mass or less, still more preferably 20% by mass or less.

The PTFE composition of the disclosure may consist only of PTFE and fibrous filler, or may further contain a different component according to need.

The different component may be a combination of various additives such as metal, inorganic or organic reinforcing fillers and compatibilizers, lubricants (carbon fluoride, carbon graphite, molybdenum disulfide), and stabilizers.

The PTFE composition of the disclosure can be produced by a known method. For example, the PTFE composition is obtainable by mixing PTFE, fibrous filler, and, if needed, a different component with a blending machine such as a V-shape blender, a tumbler, a henschel mixer, a ball mixer, or a Loedige mixer.

The PTFE composition of the disclosure has excellent stretching processability and thus can be molded into a sheet, a tube, a ring, a stretched film, and the like. The disclosure also provides a molded article obtainable by stretching the PTFE composition. The shape of the molded article may be, but is not limited to, a sheet shape, a tube shape, a ring shape, or the like.

The molded article can be produced by a conventionally known stretching method.

The PTFE composition of the disclosure may also be used as a sliding material. Examples of a product including a sliding material include various gears, bearings for sliding friction systems and rolling friction systems, bearings, brakes, clutch parts, piston rings, and various sealing materials. Suitable applications include sealing rings for various hydraulic instruments such as automatic transmission and continuously variable transmission of automobiles. In other words, the disclosure also provides a sealing ring obtainable by molding the resin composition.

For example, a desired molded article (e.g. sealing ring) may be obtained by mixing PTFE and fibrous filler with the blending machine to provide a resin composition, molding the resin composition by a molding method such as compression molding, baking the molded workpiece at 350° C. to 380° C. for 0.5 to 10 hours, and processing the baked workpiece by a technique such as cutting.

The PTFE composition can also be used as seals (tip seals, piston rings) for compressors containing gas such as carbon dioxide, natural gas, freon substitute, air, or helium gas; high water pressure seals for tall construction; sealing rings for power steering of vehicles such as trucks, buses, and automobiles; and seal bearings of construction machines such as loading shovels, forklifts, bulldozers, and nail guns.

EXAMPLES

The PTFE composition of the disclosure is described with reference to examples, but the examples are not intended to limit the PTFE composition of the disclosure.

Material compounds used in the examples are described.
(1) Polytetrafluoroethylene (PTFE)
PTFE (A)
    trade name: Polyflon M-18F, available from Daikin Industries, Ltd., standard specific gravity (SSG): 2.164, melting point: 344.9° C.
(2) Fibrous Filler
(Carbon Fiber (A))
    average fiber length: 53.0 μm, proportion of fibers having fiber length of longer than 160 μm: 0.5% by mass, proportion of fibers having fiber length of shorter than 80 μm: 94.0% by mass, aspect ratio: 3.9
(Carbon Fiber (B))
    average fiber length: 56.0 μm, proportion of fibers having fiber length of longer than 160 μm: 3.0% by mass, proportion of fibers having fiber length of shorter than 80 μm: 81.0% by mass, aspect ratio: 3.9

(Carbon Fiber (C))
  average fiber length: 114.0 μm, proportion of fibers having fiber length of longer than 160 μm: 21.0% by mass, proportion of fibers having fiber length of shorter than 80 μm: 43.0% by mass, aspect ratio: 9.5
(Carbon Fiber (D))
  average fiber length: 118.0 μm, proportion of fibers having fiber length of longer than 160 μm: 10.0% by mass, proportion of fibers having fiber length of shorter than 80 μm: 52.0% by mass, aspect ratio: 8.7

The properties evaluated in the experimental examples were determined as follows.

Compression Strength

The resin composition of each of Examples 1 and 2 and Comparative Examples 1 and 2 in an amount of 210 g was press-molded at a molding pressure of 49.0 MPa and then baked at 370° C., whereby a cylindrical molded article (external diameter 50 mm, height 50 mm) was provided. This molded article was processed into a specimen (external diameter 10 mm, height 20 mm) for a compression strength test. The specimen was compressed at a rate of 10 mm/min with Autograph AG-I available from Shimadzu Corporation until the specimen had 25% deformation in height, and the stress at this point was measured.

Pinhole

The resin composition of each of Examples 1 and 2 and Comparative Examples 1 and 2 in an amount of 210 g was press-molded at a molding pressure of 30 MPa and then baked at 370° C., whereby a cylindrical molded article (external diameter 50 mm, height 50 mm) was provided. This molded article was skived into a sheet having a thickness of about 0.13 mm. This sheet was stretched at a rate of 50 mm/min with a tensile tester Autograph AGS-J available from Shimadzu Corporation to a stretch ratio of two times, and the number of pinholes generated in the molded article at this point was observed. The pinhole observation was performed by photographing an image of the molded article at a magnification of 40× in each of randomly selected ten fields of view with a stereo microscope, and calculating the average number of the pinholes.

The average fiber length (by weight) of carbon fibers, the proportion of fibers having a fiber length of longer than 160 μm, and the proportion of fibers having a fiber length of shorter than 80 μm were determined by photographing an image of fibers at a magnification of 200× in each of randomly selected ten fields of view with a scanning electron microscope, measuring the fiber lengths of 200 fibers, and determining the target values from the distribution of the fiber lengths.

Example 1

Polytetrafluoroethylene resin powder (above PTFE (A)) obtained by suspension polymerization in an amount of 90 parts by mass and carbon fiber (A) in an amount of 10 parts by mass were mixed with a henschel mixer, whereby a PTFE composition was provided.

Example 2 and Comparative Examples 1 and 2

A PTFE composition was obtained as in Example 1, except that the type of fibrous filler was changed according to Table 1.

TABLE 1

|  | Example 1 | Example 2 | Comparative Example 1 | Comparative Example 2 |
|---|---|---|---|---|
| PTFE | M-18F | M-18F | M-18F | M-18F |
| Carbon fiber | (A) | (B) | (C) | (D) |
| Amount of carbon fiber (mass %) | 10 | 10 | 10 | 10 |
| Average fiber length of carbon fiber (μm) | 53.0 | 56.0 | 114.0 | 118.0 |
| Proportion of carbon fibers having fiber length of shorter than 80 μm (mass %) | 94.0 | 81.0 | 43.0 | 52.0 |
| Proportion of carbon fibers having fiber length of longer than 160 μm (mass %) | 0.5 | 3.0 | 21.0 | 10.0 |
| Compression strength (MPa) 25% deformation | 29.7 | 34.7 | 36.8 | 32.0 |
| Thickness of sheet (mm) | 0.130 | 0.132 | 0.130 | 0.132 |
| Number of pinholes | 0 | 0 | 9 | Broken |

Table 1 demonstrates that fibrous filler having an average fiber length of 100 μm or shorter and including carbon fibers having a fiber length of longer than 160 μm in a proportion of 15% by mass or less can provide a molded article that has a small number of pinholes and is not broken while having excellent compression strength.

The invention claimed is:

1. A polytetrafluoroethylene composition comprising polytetrafluoroethylene and fibrous filler,
   the fibrous filler being a carbon fiber,
   an amount of the carbon fiber relative to the polytetrafluoroethylene being 10 to 25% by mass,
   the carbon fiber having an average fiber length of 40 to 100 μm, and including fibers (a) having a fiber length of longer than 160 μm,
   an amount of the fibers (a) relative to the carbon fiber being 3% by mass or less,
   the polytetrafluoroethylene having non melt-processibility.

2. The polytetrafluoroethylene composition according to claim 1,
   wherein the polytetrafluoroethylene is present in an amount of 60 to 97% by mass relative to the polytetrafluoroethylene composition.

3. The polytetrafluoroethylene composition according to claim 1,
   wherein the carbon fiber is present in an amount of 3 to 10% by mass relative to the polytetrafluoroethylene composition.

4. The polytetrafluoroethylene composition according to claim 1,
   wherein the carbon fiber has a fiber length of shorter than 80 μm in a proportion of 75% by mass or more.

5. The polytetrafluoroethylene composition according to claim 1,
wherein the carbon fiber has an aspect ratio of 3.0 to 6.0.

* * * * *